United States Patent
Willenbrock et al.

(10) Patent No.: US 6,850,840 B1
(45) Date of Patent: Feb. 1, 2005

(54) METHOD FOR DESCRIBING AND GENERATING ROAD NETWORKS AND CORRESPONDING ROAD NETWORK

(75) Inventors: Ralf Willenbrock, Berlin (DE); Hans Hubschneider, Karlsruhe (DE); Ulrich Mehlhaus, Karlsruhe (DE); Michael Ortgiese, Karlsruhe (DE)

(73) Assignees: Volkswagen AG, Wolfsburg (DE); PTV AG, Karlsruhe (DE)

( * ) Notice: Subject to any disclaimer, the term of this patent is extended or adjusted under 35 U.S.C. 154(b) by 133 days.

(21) Appl. No.: 10/129,864

(22) PCT Filed: Nov. 2, 2000

(86) PCT No.: PCT/EP00/10790

§ 371 (c)(1),
(2), (4) Date: Aug. 23, 2002

(87) PCT Pub. No.: WO01/35370

PCT Pub. Date: Aug. 17, 2001

(30) Foreign Application Priority Data

Nov. 11, 1999 (DE) ......................................... 199 54 498
Oct. 20, 2000 (DE) ......................................... 100 52 109

(51) Int. Cl.$^7$ ............................................. G06F 163/00
(52) U.S. Cl. ....................... 701/208; 701/200; 701/117; 340/910; 340/955.13; 73/178 R
(58) Field of Search ................. 701/208, 200, 701/24, 117; 340/905, 910, 995.13; 73/178 R

(56) References Cited

U.S. PATENT DOCUMENTS 6,282,492 B1 * 8/2001 Gorai et al. ................. 701/209
6,401,027 B1 * 6/2002 Xu et al. ..................... 701/117
6,466,867 B1 * 10/2002 Sakashita .................... 701/211
6,542,816 B1 * 4/2003 Ito et al. ..................... 701/209

FOREIGN PATENT DOCUMENTS

| | | |
|---|---|---|
| DE | 195 08 468 | 6/1996 |
| DE | 195 13 640 | 6/1996 |
| DE | 196 43 454 | 4/1998 |
| DE | 197 50 775 | 6/1998 |
| DE | 197 53 170 | 6/1998 |
| DE | 197 50 774 | 7/1998 |
| EP | 0 798 540 | 10/1997 |
| EP | 0 889 454 | 1/1999 |
| EP | 0 902 406 | 3/1999 |
| WO | WO 98/36397 | 8/1998 |

* cited by examiner

*Primary Examiner*—Thomas G. Black
*Assistant Examiner*—Arthur D. Donnelly
(74) *Attorney, Agent, or Firm*—Kenyon & Kenyon

(57) ABSTRACT

A method is for describing and generating road networks for determining traffic information or road traffic data and/or for determining the traveling times on routes or stretches of routes by at least one mobile detector. The mobile detector includes a position determining device and a device for data communication with a control center. A road network is for determining traffic information and/or for determining the traveling time by at least one mobile detector, e.g., a vehicle. The road network and/or parts of the road network are substantially described by node and/or contour points.

46 Claims, 4 Drawing Sheets

METHOD FOR DESCRIBING AND GENERATING ROAD NETWORKS AND CORRESPONDING ROAD NETWORK

FIELD OF THE INVENTION

The present invention relates to a method of describing and generating road networks for ascertaining traffic information or traffic-condition data and/or ascertaining driving times on routes or segments of routes, using at least one mobile detector, e.g., a vehicle, the mobile detector having a position-determination device and a device for data communication with a main station. The present invention also relates to a road network for ascertaining traffic information and/or ascertaining driving times, using at least one mobile detector, e.g., a vehicle.

BACKGROUND INFORMATION

German Published Patent Application No. 197 50 775 describes a method for selecting traffic-information items, which are transmitted by a main station and relate to a route of a vehicle. In this context, the route is determined in the form of route points between a starting point and a target point in the traffic network, and relevant traffic information is selected by defining, in each instance, a zone between two route points and selecting traffic information relating to a location inside the zone to be relevant, while selecting traffic information relating to a location outside the zone as not being relevant. In so doing, the zone is defined as a corridor between two lines, which are parallel to a connecting line between two route points and are at a predetermined or specifiable distance from the connecting line.

German Published Patent Application No. 197 53 170 describes a method for transmitting route information relating to a recommended route of a vehicle in a traffic network, from a main traffic station to a terminal in a vehicle, where the route information relates to route points on the route of the vehicle. In each instance, a route point is defined at a location at which the vehicle can continue in a plurality of directions. The location data determining the location of the route point, the geometric data relating to the intersection geometry of the route point, and the transition data defining the route through the route point are transmitted for each route point.

In addition, a method of transmitting data for assessing a traffic situation is described in German Published Patent Application No. 196 43 454. In the method, data for assessing the traffic situation in route segments of a road network are acquired by a plurality of vehicles working as mobile detectors, and transmitted to a main station. To assess the traffic situation, it is also provided that, in each instance, a current driving profile is formed from the acquired sensor data in the vehicle, and characteristic properties are derived from the current driving profile in the sense of actual values. In addition, characteristic driving-profile properties are formed in the vehicle, in the sense of expected values, using predetermined traffic-situation information. The actual values and the expected values of the driving-profile properties are compared to each other. The result of the comparison is evaluated in the vehicle, using predefined decision criteria, data for assessing the traffic situation only being transmitted to the main station in the cases in which this is provided according to the decision criteria.

Furthermore, German Published Patent Application No. 197 50 774 describes a method for transmitting traffic information relating to a traffic network and representing the traffic situation, from a main traffic station to a terminal of a vehicle, traffic information relating to at least one route of the traffic network being transmitted, in each case, for route segments of the route, at least with predetermined qualification of the traffic situation, in the form of qualified speeds in the speeds representing the route segments.

It is an object of the present invention to provide a method for describing and generating road networks and a road network, in order to ascertain traffic information and/or ascertain driving times, using at least one mobile detector.

SUMMARY

According to the present invention, the road network is mainly described by nodal points, which are defined at, e.g. intersections, freeway intersections, and connection points, but also at service areas or parking lots. If the distance between two nodal points exceeds a predefined length, then contour points, which may describe the geographic position of a link, are inserted on the route. A link may be a connection between two nodal points. However, for certain application cases, a link may also be defined as a connection of several nodal points or a connection between contour points, or between nodal points and contour points. It is also possible to include synchronous points in the definition of a link. Synchronous points are located a certain distance from a nodal point on the link. This distance may be determined by the nodal geometry, e.g., by the number and the angle of the outgoing links, and may be freely selectable. Synchronous points are used to detect a link driven on by the mobile detector, or to determine on what part of the link asynchronous traffic-condition reports are transmitted from the mobile detector to the main station.

An example embodiment of the present invention provides for a contour point that immediately follows a nodal point being defined as a synchronous point on a link.

In order to compensate for inaccuracies in determining the position of the mobile detector while determining whether the mobile detector has passed a nodal point, contour point, or synchronous point, the nodal points, contour points, and/or synchronous points determined as points using constant coordinates may have a range or catch radius. Detected coordinates of the specific coordinate range of the range are evaluated as belonging to the constant coordinates of the respective nodal point, contour point, or synchronous point. The ranges or catch radii may be freely adjustable and their dimensions may be determined as a function of the point geometry, the point extension of the road width, and/or the positional accuracy.

In addition, the dimensions of the ranges may be selected by or as a function of the average speed being driven in the respective range.

The ranges of nodal points, contour points, or synchronous points may not overlap.

Another example embodiment of the present invention provides for individual, tightly spaced nodal points and/or contour points being defined, in each case, as a nodal point or contour point having a surrounding nodal range. Using the surrounding nodal range, complex intersections may therefore be covered by a central node, which means that the complexity of the road network is reduced.

Another example embodiment of the present invention provides for links, i.e., the connection between nodal points, contour points, and/or synchronous points, being defined as a lane or corridor of coordinates, which may have a width corresponding to the diameter of the ranges of synchronous points.

The link detection, i.e., on what link the mobile detector is arranged, may be performed, using the last nodal point driven through and the synchronous point subsequently reached.

Nodal points, contour points, and/or synchronous points, and thus links as well, may also be modifiable, insertable, deletable, capable of being activated as a function of time, and/or capable of being deactivated as a function of time, and/or shiftable.

In addition, it may be provided that at least a portion of the nodal points and/or the links has static and/or dynamic attributes, in particular the road type and/or class of road or average speeds.

Another example embodiment of the present invention provides for the road network being established and/or changed or adapted in the main station and being transmitted to the mobile detector, in order to detect traffic conditions and/or determine driving times on segments of a route.

Another example embodiment may provide for the road network being stored in a device of the mobile detector.

A traffic-condition determination, e.g., one that is synchronous, may occur upon reaching the end of the link. This is accomplished in that, at the end of each link, the movement parameters of the mobile detector ascertained and/or detected while traveling on a link are compared to reference values stored for the link, and, in response to the occurrence of a predefined difference, a status message is sent by the mobile detector to the main station.

The road network of the present invention may be generated in a data-processing device. Nodal points, contour points, and synchronous points are set and, therefore, the individual links also being defined and stored, with the aid of a digital map of the real road network. The data records generated in this manner may subsequently be made available to an arbitrary number of mobile detectors.

The present invention is described below on the basis of example embodiments.

DETAILED DESCRIPTION

Figure 1:
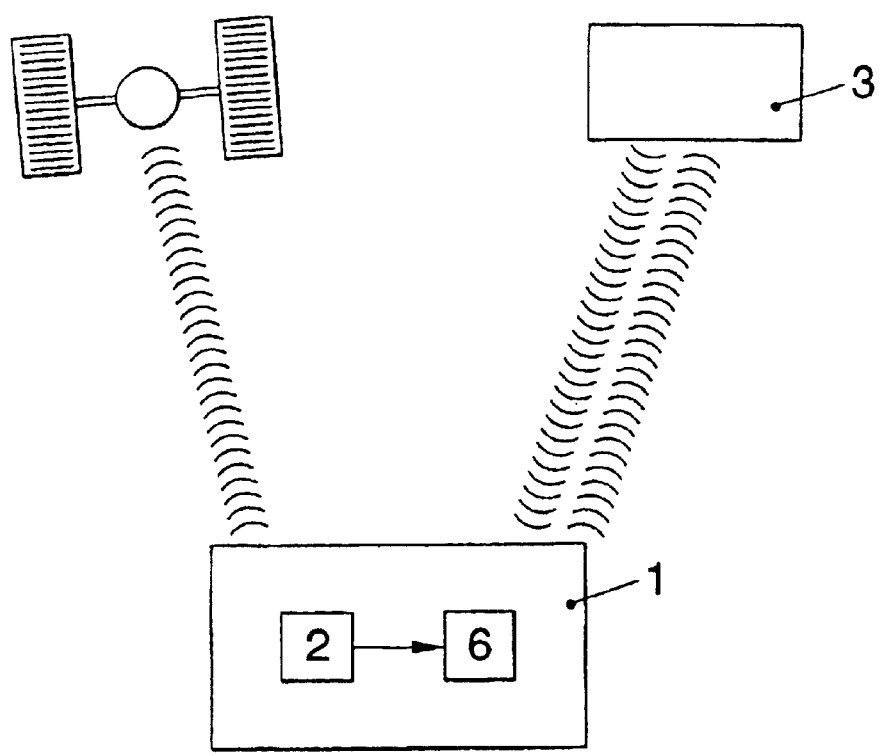
FIG. 1 is a block diagram of a system for determining traffic conditions.

Illustrated in FIG. 1 is a system for acquiring traffic information and/or driving times on a route driven by at least one mobile detector 1, e.g., a motor vehicle.

Mobile detector 1, which has a position-determination device for determining the geographic coordinates of its current position, e.g., a satellite-aided detection device 2, and at least one device 6 for data communication with a main station 3, continuously transmits, in the simplest case, its geographic coordinates to main station 3, which ascertains traffic conditions and driving times from the temporal change in the geographic coordinates. In other cases, movement data picked up by the vehicle's own sensors is evaluated by mobile sensor 1 and, for example, sent to main station 3 as a function of a comparison with expected values. Such methods are described, for example, in German Published Patent Application No. 195 13 640, German Published Patent Application No. 196 43 454, or International Published Patent Application No. WO 98/36397. A problem with these methods is that mobile sensor 1 knows its geographic position, but not its position in the actual traffic network. This creates the danger of incorrect reports or a large number of irrelevant or only slightly relevant traffic-condition reports.

The following is a description of a traffic-information acquisition network 5, which is permanently stored in mobile detector 1. Changes or adaptations, even updates from main station 3, are transmitted to mobile detectors 1 via data-communication path 4, which is bidirectional in this case. In this context, it is possible for the stored road network or parts of it to only be valid as a function of time or for certain times. For example, a road network valid in times of high traffic may be different from one valid on Sundays and holidays.

Figure 2:
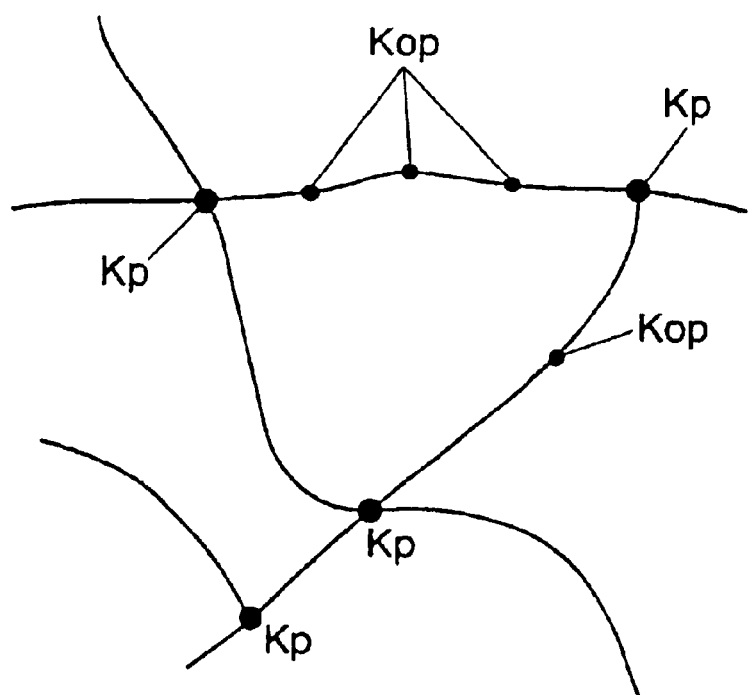
FIG. 2 is a detail view of a road network according to the present invention.

Traffic network 5, which is used as a basis for ascertaining traffic information, is stored in the form of a network made of a number of links St and a number of nodal points Kp (FIG. 2), nodal points Kp being defined and stored at relevant points of the traffic network relevant for ascertaining the traffic condition, such as road intersections, freeway intersections, and freeway connection points. In addition, nodal points Kp may also be inserted at freeway service areas and parking lots. Nodal points Kp also represent starting points and end points of links St. If the distance between adjacent nodal points Kp and, therefore, the length of the connecting links St, considerably exceeds the average length, then contour points Kop are introduced. Contour points Kop are used so that a link St approximates the real course of the road. On average, this approximation is achieved by having five contour points Kop between two nodal points Kp, which describe the geographic position of the links St. The extreme points of the course of a road are determined for generating contour points Kop. To this end, a virtual linear connection is formed between two nodal points Kp. The longest distance from the road to this virtual, linear connection, as well as the points of intersection with the linear connection, are determined on both sides of this connection in an alternating manner. If the course of the road does not intersect the linear connection, then maxima and minima are alternatingly determined. Contour points Kop may now be determined from these ascertained extrema. If there are more extrema than contour points Kop, then it is decided if the extrema of the highest magnitude is set as a contour point Kop, or if an additional nodal point Kp is inserted.

Figure 3:
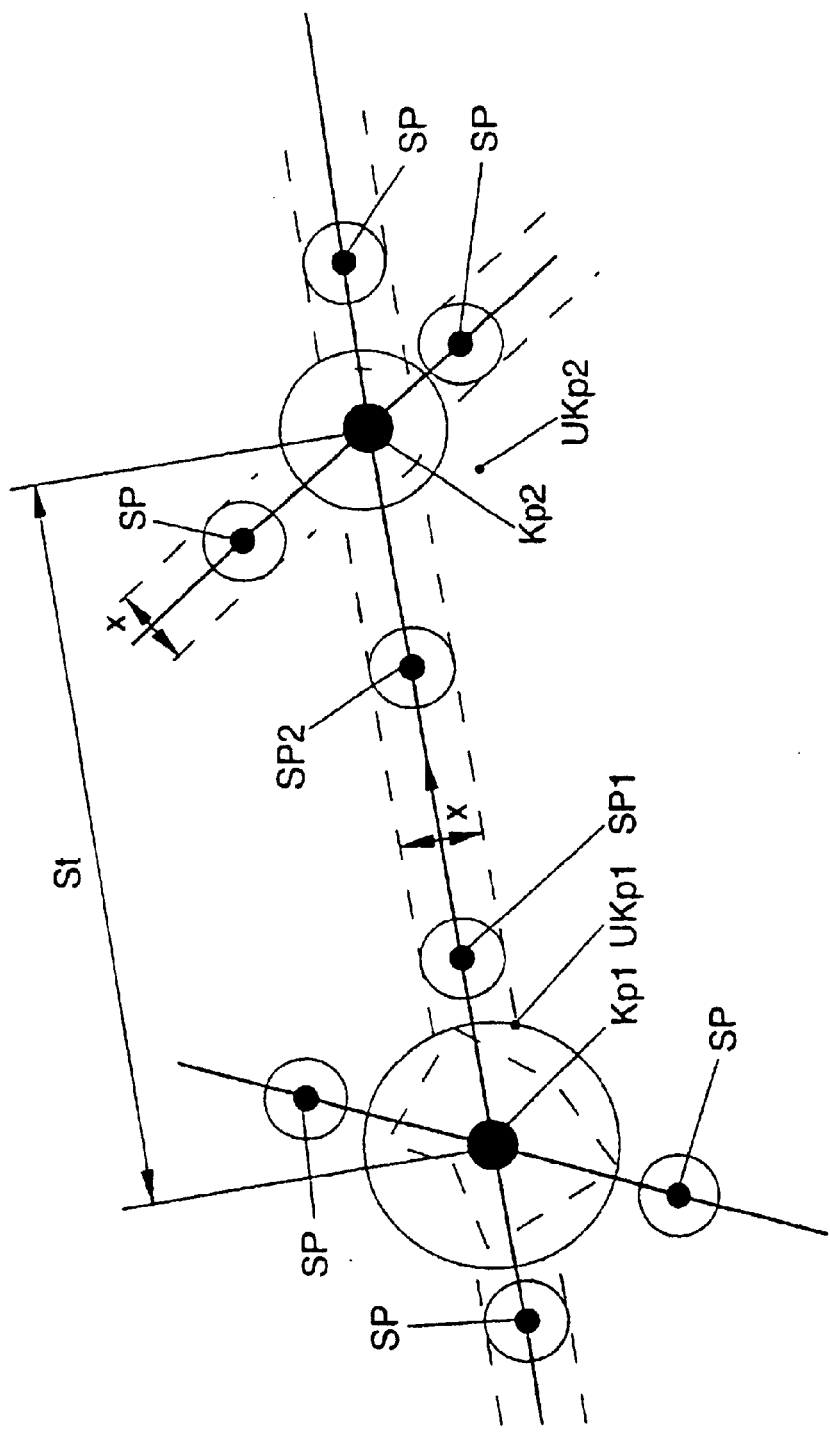
FIG. 3 is a further detail view of the road network according to the present invention.

A problem occurs in complex intersections KR, since the number of outgoing roads in them and, in particular, the inaccuracies that may occur in determining the position, may make it difficult to localize the mobile detector in the intersection and assign it to a link. For this reason, synchronous points SP are inserted, as illustrated in FIG. 3. Synchronous points SP are arranged at a predetermined distance from nodal point Kp on link St. This distance is determined by the local conditions, such as turning lanes, the angle of the roads branching off from the real intersection KR or the angle of the links St branching off from nodal point Kp, and the complexity of the intersection in itself, and is freely selectable. Synchronous points SP are first of all used to delimit an area around nodal point Kp, in which asynchronous traffic-condition reports are excluded, and secondly allow the traveled link St to be unequivocally assigned. In order to rule out possible erroneous messages of the mobile detector at complex intersections, due to traffic conditions that are difficult to identify and closely spaced traffic lights, the report of an ascertained, asynchronous traffic condition is only enabled upon reaching the starting synchronous point SP1 following nodal point Kp1 on link St. Examples of asynchronous traffic conditions include traffic jams causing very long delays, or road closings. An asynchronous report is blocked in response to reaching ending synchronous point SP2. In contrast, the report of a synchronous traffic condition, such as a classical stop-and-go situation, is only dispatched to the main station at the end of link St, at nodal point Kp2.

By effectively positioning synchronous points SP, reports of asynchronous traffic conditions may even be excluded in problem situations, such as parking lots on freeways and federal highways.

As described above, the synchronous points are also used to assign the mobile detector to a link St. For localization purposes, each link St may have a starting synchronous point SP1. The position-determination device of the mobile detector identifies the starting synchronous point SP1 following nodal point Kp1 in the direction of travel, and may unequivocally assign the mobile detector to a link.

Figure 4:
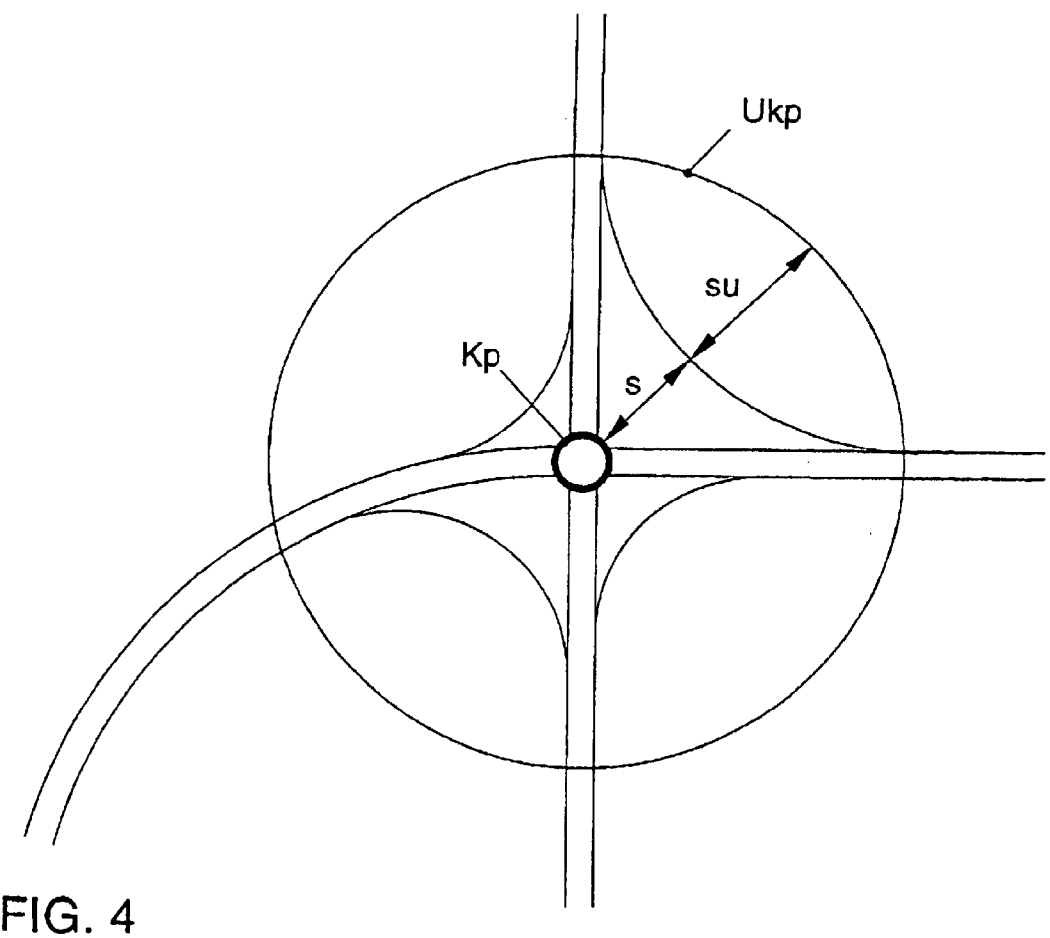
FIG. 4 is a schematic view of a nodal point Kp of the road network according to the present invention.

Nodal points Kp, but also contour points Kop and synchronous points SP, are defined as points, using constant or fixed coordinates. In order to compensate for inaccuracies in the determination of position, in particular in satellite-aided position determination, ranges Ukp or catch radii are positioned around nodal points Kp. Such ranges Ukp may also be positioned around contour points Kop or synchronous points SP. All of the ascertained mobile-detector positions having coordinates arranged in the range are then evaluated as belonging to the respective point. The dimensions of ranges Ukp or catch radii may be adapted to the specific local conditions of the actual road map. In the case of smaller and simpler intersections, range Ukp may be assigned a permanent default value, which, for example, is equivalent to the inaccuracy of the position-determination device. But as soon as intersections become more complex and have more outgoing roads, ramps, or intermediate sections, then range Ukp may be determined appropriately. To this end, the minimum distance is determined from nodal point Kp to all the roads leading past nodal point Kp. The greatest of these calculated distances s added to inaccuracy su of the position-determination device of the mobile detector yields the radius of the range (FIG. 4). The maximum range is set to a certain value, i.e., the sum of greatest calculated distance s and greatest inaccuracy su of the position determination device may not exceed this value. If this is the case, then the intersection is covered by a plurality of nodal points Kp.

In order to be able to detect when the mobile detector leaves the link St between two nodal points Kp, a corridor or an alley having a width x (FIG. 3) is defined on both sides of link St. Width x of the corridor may be the same for all links St. In this case, the boundary condition is the number of contour points Kop.

In the example embodiment, it was stated that links St are defined by two nodal points Kp. However, there are also application cases, in which a link St is defined by contour points Kop and synchronous points SP, or the link covers several of the points.

The described road network for ascertaining and transmitting traffic conditions and/or driving times may not be designed to be static, but rather dynamic, and may be adaptable to the specific traffic volume and, therefore, the relevance of traffic-condition reports as well as changing spatial and temporal boundary conditions and special requirements of, e.g., the customers of the traffic information.

Every link of the road network according to the present invention may be activated or deactivated at any time, as needed, e.g., during times of low traffic volume, and as a function of the day, time of day, and the time of year. In addition, links St may be assigned different functions or attributes. Thus, links may only be provided for asynchronous traffic-condition reports or may not be provided for asynchronous condition reports inside the road network of the present invention.

What is claimed is:

1. A method of describing and generating road networks for ascertaining at least one of traffic information and driving times, at least part of the road networks including nodal points and links connecting the nodal points, comprising the steps of:

acquiring geographic data by a position-determination device of at least one mobile detector;

communicating data between the detector and a main station; and forcing at least one link to approximate a real course of a road between two nodal points in accordance with at least one contour point if the distance between the two nodal points exceeds a predetermined distance.

2. The method according to claim 1, wherein the detector includes a motor vehicle.

3. The method according to claim 1, further comprising the steps of:

determining each nodal point and contour point as a point in accordance with fixed coordinates, each point having a range determined in accordance with a coordinate range; and evaluating coordinates of the coordinate range as belonging to the fixed coordinates of the respective one of the nodal point and contour point.

4. The method according to claim 1, further comprising the step of establishing synchronous points between at least a portion of the nodal points at a selected distance from the nodal point, the synchronous points configured to identify one of a route and a link traveled by the mobile detector.

5. The method according to claim 4, further comprising the step of determining a distance from the synchronous point to the nodal point in accordance with nodal geometry.

6. The method according to claim 5, wherein the distance from the synchronous point to the nodal point is determined in the distance determining step in accordance with an angle of an outgoing link and a complexity of the nodal point.

7. The method according to claim 4, wherein the synchronous point corresponds to a contour point that follows a nodal point on a link.

8. The method according to claim 1, further comprising the step of defining the contour points of a link in accordance with extremal deviations of a linear connection of two nodal points from the real course of the road.

9. The method according to claim 4, further comprising the step of detecting a link in accordance with a last at least one of a nodal point and a contour point driven through and a synchronous point subsequently reached.

10. The method according to claim 4, further comprising the steps of:

determining the synchronous points as points in accordance with fixed coordinates, each point having a ranged determined in accordance with a coordinate range; and evaluating coordinate of the coordinate range as belonging to the fixed coordinates of the respective synchronous point.

11. The method according to claim 4, further comprising the step of determining dimensions of ranges of at least one of the nodal points, the contour points and the synchronous points in accordance with at least one of nodal geometry, an extension thereof, a road width and a locational accuracy.

12. The method according to claim 4, further comprising the step of determining dimensions of ranges of at least one of the nodal points, the contour points and the synchronous points in accordance with an average speed driven in the respective range.

13. The method according to claim 4, further comprising the step of at least one of determining and changing dimensions of ranges of at least one of the nodal points, the contour points and the synchronous points by the main station.

14. The method according to claim 4, wherein ranges of the nodal points, the contour points and the synchronous points do not overlap.

15. The method according to claim 1, further comprising the step of defining adjacent at least one of nodal points and contour points having coordinate ranges that are not distinguishable with sufficient reliability as a single one of a nodal point and a contour point having a surrounding nodal range.

16. The method according to claim 4, further comprising the steps of:
    forming a lane on both sides of a link, the lane including coordinate that are within a predetermined distance of the link; and
    exiting the lane to reveal exiting of the link.

17. The method according to claim 16, wherein the predetermined distance corresponds to a diameter of ranges of the synchronous points.

18. The method according to claim 4, wherein at least one of the nodal points, the contour points and the synchronous points are at least one of modifiable, insertable, deletable, activatable as a function of time, deactivatable as a function of time and shiftable.

19. The method according to claim 1, wherein at least a portion of at least one of the nodal points and the links has at least one of static and dynamic attributes.

20. The method according to claim 19, wherein the attributes include at least one of a type and a class of road and average transit times.

21. The method according to claim 1, further comprising the steps of:
    at least one of defining and modifying the road network in the main station; and
    transmitting the one of the defined and modified road network to the mobile detector to identify traffic conditions on a route traveled by the mobile detector.

22. The method according to claim 2, further comprising the step of storing the road network in a device of the vehicle.

23. The method according to claim 21, further comprising the step of identifying the traffic conditions upon reaching an end of the link.

24. The method according to claim 23, further comprising the steps of:
    at least one of ascertaining and detecting movement parameters of the mobile detector at the end of each link while traveling on the link;
    comparing the movement parameters to reference values stored for the link; and
    sending a status message by the mobile detector to the main station in response to an appearance of a predefined difference between the movement parameters and the reference values.

25. The method according to claim 4, further comprising the steps of:
    superimposing at least the nodal points, the contour points and the synchronous points on a digital map in a processing device; and
    storing the nodal points, the contour points and the synchronous points by the processing device.

26. A road network for ascertaining at least one of traffic information and driving times in accordance with a mobile detector, comprising:
    nodal points;
    links connecting the nodal points; and
    contour points configured to force at least one link to approximate a real course of a road between two nodal points if a distance between the two nodal points exceeds a predetermined length.

27. The road network according to claim 26, wherein the mobile detector includes a vehicle.

28. The road network according to claim 26, wherein at least one of the nodal points and the contour points include points having fixed coordinates, each point including a range determined in accordance with a coordinate range, coordinates of the coordinate range evaluated as belonging to the fixed coordinates of the one of the nodal point and the contour point.

29. The road network according to claim 26, further comprising synchronous points established between at least a portion of the nodal points at a selected distance from the nodal point, the synchronous points configured to detect one of a route and a link traveled by the mobile detector.

30. The road network according to claim 29, wherein a distance from the synchronous point to the nodal point is determined by nodal geometry.

31. The road network according to claim 30, wherein the distance is determined in accordance with an angle of an outgoing link and a complexity of the nodal point.

32. The road network according to claim 29, wherein the synchronous point includes a contour point that follows at least a portion of the nodal points on a link.

33. The road network according to claim 29, wherein a beginning and an end of the links are defined by at least one of at least two nodal points, at least two contour points, at least one nodal point and at least one contour point, at least two synchronous points, at least one synchronous point and at least one nodal point, and at least one synchronous point and at least one contour point.

34. The road network according to claim 29, wherein the synchronous points are determined as points having fixed coordinates, each point having a range determined by a coordinate range, coordinates of the coordinate range evaluated as belonging to the fixed coordinates of the respective synchronous point.

35. The road network according to claim 29, wherein dimensions of the ranges of at least one of the nodal points, the contour points and the synchronous points are determined by nodal geometry, an extension thereof, a road width and a locational accuracy.

36. The road network according to claim 29, wherein dimensions of the ranges of at least one of the nodal points, the contour points and the synchronous points are determined by an average speed driven in the respective range.

37. The road network according to claim 29, wherein a main station is configured to at least one of determine and change dimensions of the ranges of at least one of the nodal points, the contour points and the synchronous points.

38. The road network according to claim 29, wherein the ranges of the nodal points, the contour points and the synchronous points do not overlap.

39. The road network according to claim 26, wherein adjacent at least one of nodal points and contour points having coordinate ranges that are indistinguishable with sufficient reliability are defined as a single one of a nodal point and a contour point having a surrounding nodal range.

40. The road network according to claim 29, further comprising a lane formed on both sides of a link, the lane including coordinates arranged within a predetermined distance of the link.

41. The road network according to claim 40, wherein the predetermined distance corresponds to a diameter of ranges of the synchronous points.

42. The road network according to claim 29, wherein at least one of the nodal points, the contour points and the synchronous points are at least one of insertable, deletable, activatable as a function of time, deactivatable as a function of time and shiftable.

43. The road network according to claim 26, wherein at least a portion of at least one of the nodal points and the links includes at least one of static and dynamic attributes.

44. The road network according to claim 43, wherein the attributes include at least one of a type and a class of road and an average transit time.

45. The road network according to claim 26, further comprising a main station including a traffic computer configured to at least one of define and modify the road network, the main station configured to transmit the at least one of defined and modified road network to the mobile detector via a data-communications path to identify traffic conditions on a link traveled by the mobile detector.

46. The road network according to claim 27, wherein the vehicle includes a device configured to store the road network.

* * * * *